June 4, 1935.　　　M. A. PRUD'HOMME　　　2,003,607
HAND BRAKE MECHANISM
Filed March 14, 1934　　2 Sheets-Sheet 2

Inventor
MICHAEL A PRUD'HOMME
Attorney

Patented June 4, 1935

2,003,607

UNITED STATES PATENT OFFICE 2,003,607

HAND BRAKE MECHANISM

Michael A. Prud'homme, Outremont, Quebec, Canada

Application March 14, 1934, Serial No. 715,411
In Canada December 30, 1933

1 Claim. (Cl. 188—81.1)

This invention relates to hand-operated brake mechanisms for railway cars and particularly to improved means for mounting the brake mast and the pawl and ratchet locking means to provide a simple and compact assembly that is useful in connection with the brake mechanisms on different types of railway cars.

A further feature resides in the specific manner in which the various parts are constructed and combined to provide a simple and compact assembly in which the parts are positively held in their proper cooperative relation to ensure efficient functioning of the brake mechanism under actual service conditions.

Proceeding now to a more detailed discussion of this invention, reference will be had to the accompanying drawings wherein—

Figure 1:
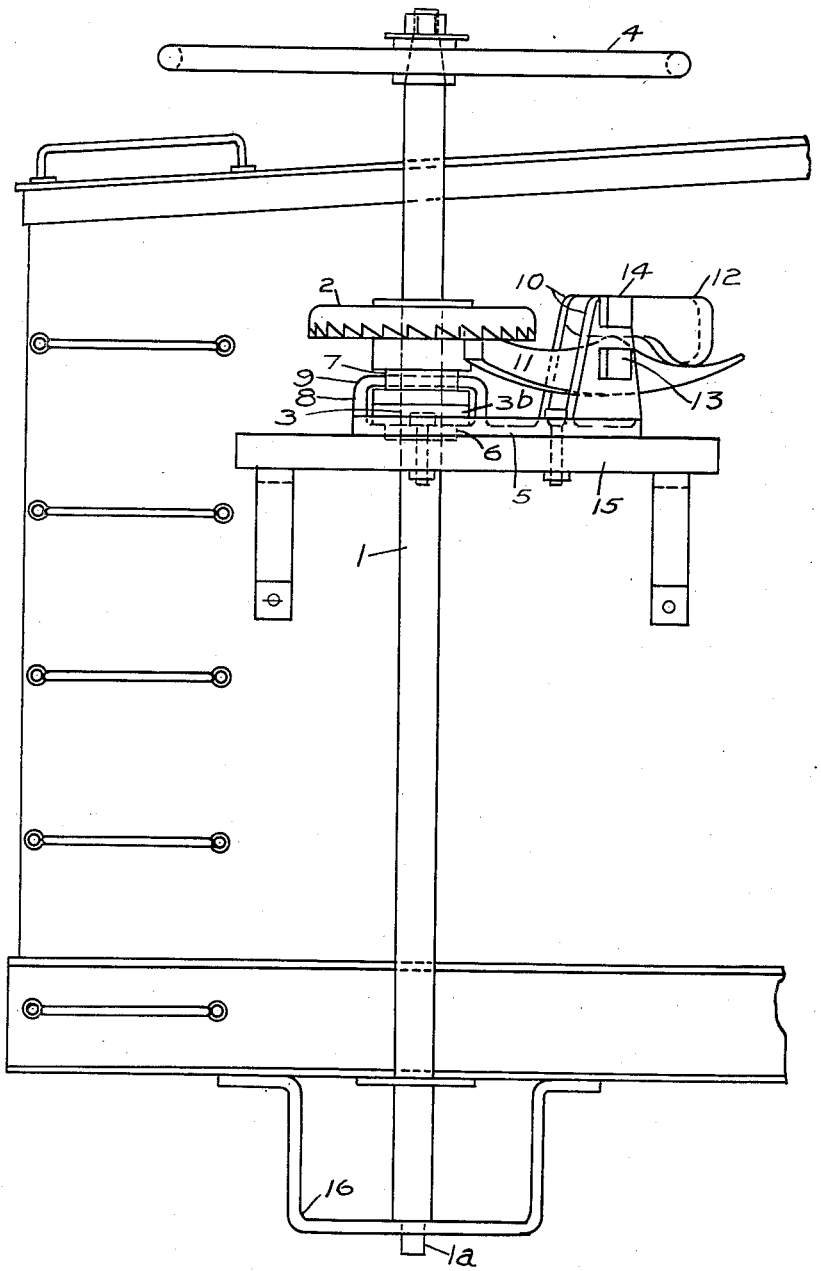
Fig. 1 is an end view of a box car equipped with a brake mechanism embodying the improvements provided in accordance with this invention.

In the present drawings the invention is shown in connection with the brake mechanism of a box car but it will be understood that, with appropriate changes, the invention is also applicable to various other types of railway cars.

Referring more particularly to the drawings, 1 designates the brake mast which preferably comprises a rolled steel bar of non-circular cross section on which the ratchet wheel 2 and the ratchet supporting bushing 3 are fitted. In the present instance I have shown a square mast passing through correspondingly shaped openings in the ratchet wheel and bushing so that these elements will turn with the mast in response to operation of a hand wheel 4 or other operating means attached to the upper end of the mast. The upper portion of the bushing 3 is enlarged to provide a flange 3b which rests on the upper surface of the brake mast plate 5 to support the lower portion of the bushing in the bearing opening 6. The hub of the ratchet 2 rests on the upper surface of the bushing 3 and is provided with a circular recess 7. It will be noticed that the ratchet 2 which has downwardly projecting teeth is formed at a point adjacent the upper end of the hub and that this hub extends downwardly for a sufficient distance to form a spacing means between the ratchet and its support on the plate 5. Formed in the hub below the ratchet 2 is a circular recess 7. A retaining wall 8 rising from the plate 5 is provided at its upper edge with a horizontal semi-circular flange 9 which fits into the ratchet recess 7. This flange provides a bearing for the ratchet which extends around one half the circumference of the recess 7. It also serves as a downhold flange which, in conjunction with the bushing 3, prevents axial movement of the ratchet in either direction, lateral movement of both the brake mast and ratchet being prevented by the fitting of the bushing in the opening 6. The brake mast plate 5 is provided with a pair of upstanding bracket members 10 between which the ratchet engaging pawl 11 and the pawl operating weight 12 are pivoted as indicated at 13 and 14, the free end of the weight being disposed to bear downwardly on the tail of the pawl thus urging the opposite end of the pawl into engagement with the teeth of the ratchet 2. The end of the pawl 11 thus lies in the space between the ratchet 2 and the circular recess 7. The fitting of the bushing 3 in the opening 6 determines the position of the brake mast 1 and ratchet 2 with respect to the pawl 11 and thus ensures that these parts will be effectively held in their co-operative relationship.

Figure 2:
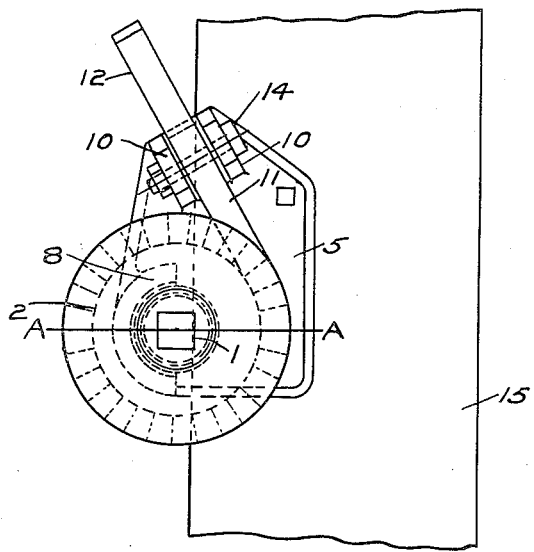
Fig. 2 is a top plan view of the improved brake mechanism.
Figure 4:
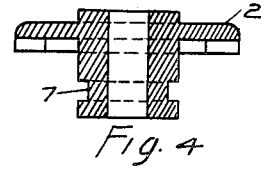
Fig. 4 is a view of the ratchet in vertical section, the plane of the section being indicated by the line A—A of Fig. 2.
Figure 5:
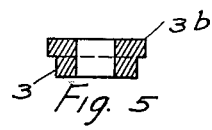
Fig. 5 is a view of the bushing in vertical section, the plane of this section being also indicated by the line A—A of Fig. 2.
Figure 3:
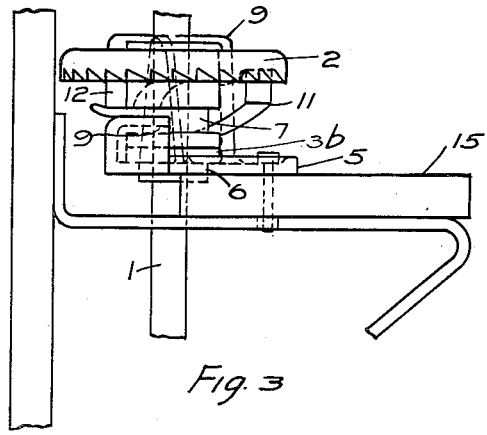
Fig. 3 is a side view of the assembly appearing in Fig. 2.
Figure 6:
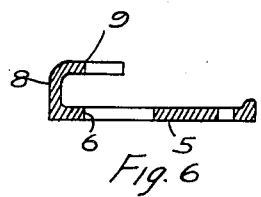
Fig. 6 is a transverse sectional view through the brake mast plate along the line A—A of Fig. 2.

In assembling the parts herein described the plate 5 carrying the pawl 11 and pawl operating weight 12 is fastened to the step 15 as shown to advantage in Figs. 1, 2, and 3. The bushing 3 is then slid beneath the ratchet retaining flange 9 and dropped into the opening 6 in which it is supported by the flange 3b. The ratchet wheel 2 is then mounted on the upper end of the bushing by a laterally sliding movement in the course of which the flange 9 is engaged in the recess 7 so that the portion of the ratchet below the recess is confined between the flange and the bushing thereby holding the ratchet against vertical displacement. The brake mast is then passed through the mast receiving openings of the ratchet and bushing, the lower cylindrical end 1a of the mast being engaged in the bearing opening provided therefor in the lower step 16. Owing to the cross sectional shape of the brake mast and the corresponding shape of the openings formed in the ratchet and the bushing a drive connection is established between these parts without the use of pins or keys. It will be noted that by my present construction I have provided a hand brake mechanism in which the parts are not only held in alignment and against displacement but also one in which there is provided a ratchet mechanism having downwardly extending teeth and a pawl beneath the ratchet in engagement with the teeth, all the aligning, holding parts, as well as the pawl and ratchet being comprised in a compact structure.

Having thus described my invention, what I claim is:

In a hand brake mechanism of the character described the combination of a brake mast, a hub in operative engagement with the mast and having adjacent its upper end a ratchet with downwardly projecting teeth and adjacent its lower end a circular recess, a bearing plate having bearing means for the hub, said plate having a part in engagement with the hub recess to retain the parts in place and a pawl in position to engage the ratchet teeth between said teeth and said hub recess.

MICHAEL A. PRUD'HOMME.